INVENTORS.
RICHARD L. VERNON
HAROLD E. HOBEN
BY
Agent

Sept. 20, 1966 R. L. VERNON ETAL 3,273,831
CONTROL MECHANISM FOR AIRCRAFT
Filed July 29, 1963 10 Sheets-Sheet 2

INVENTORS.
RICHARD L. VERNON
HAROLD E. HOBEN
BY
Agent

Sept. 20, 1966 R. L. VERNON ETAL 3,273,831
CONTROL MECHANISM FOR AIRCRAFT
Filed July 29, 1963 10 Sheets-Sheet 9

INVENTORS.
RICHARD L. VERNON
HAROLD E. HOBEN
BY
Agent

United States Patent Office 3,273,831
Patented Sept. 20, 1966

3,273,831
CONTROL MECHANISM FOR AIRCRAFT
Richard L. Vernon, Glendale, and Harold E. Hoben, Northridge, Calif., assignors to Lockheed Aircraft Corporation, Burbank, Calif.
Filed July 29, 1963, Ser. No. 298,366
10 Claims. (Cl. 244—83)

This invention relates to control mechanisms for aircraft and more particularly to an automatic aileron droop mechanism.

Aircraft ailerons are each conventionally positioned by a differential bell crank mechanism which is usually designed to swing the aileron through a longer arc to its upper deflection angle than to its lower deflection angle for the same degree of movement of the aileron control. This is accomplished by having a differential acceleration between the input and output levers on the bell crank. Mechanisms are available to link the ailerons to the flaps of the aircraft in such a manner that the ailerons will droop when the flaps are lowered and serve as auxiliary flaps to reduce takeoff and landing distances. Assuming that the ailerons are drooped 7½° while serving as auxiliary flaps and it is then necessary to swing one aileron to its upper deflection angle (25°) and lower the other one to its lower deflection angle (15°), a problem then arises because the same degree of rotation of the aileron control operating through a conventional differential bell crank mechanism, which is designed to swing one aileron 25° to its upper deflection angle and the other 15° to its lower deflection angle, will position the one aileron 7½° short of its upper deflection angle and the other aileron 7½° past its lower deflection angle. One prior art attempt to overcome this problem uses a mechanism which decreases the upper deflection angle of the aileron by an angle equal to the intended droop angle. While generally satisfactory, this mechanism has the disadvantage that it makes it difficult to prevent ailerons from exceeding their maximum effective deflection angles and stalling out. Another prior art mechanism allows the upper deflection angle to decrease by the angle that the neutral position droops. This has the disadvantage of reducing aileron effectiveness in a flight attitude that is already critical.

Another disadvantage with prior art mechanisms for drooping ailerons resides in the fact that they are relatively complicated and add considerably to the weight of the aircraft.

Another disadvantage of employing prior art mechanisms for drooping ailerons resides in the fact that full aileron response is not retained.

In view of the foregoing factors and conditions characteristic of mechanisms for drooping aircraft ailerons, it is a primary object of the present invention to provide a new and improved mechanism for automatically drooping ailerons which is not subject to the disadvantages enumerated above and which has a linkage system especially designed for retaining normal aileron operation regardless of the neutral position of the control surface without exceeding maximum useful limits.

Another object of the present invention is to provide a mechanism for automatically drooping ailerons which is mechanically simple, of light weight and relatively inexpensive.

Yet another object of the present invention is to provide a mechanism for automatically drooping ailerons employing a dual action mechanical linkage utilizing two bell cranks at each aileron with one bell crank controlling aileron droop and the other causing asymmetric motion of the ailerons.

A further object of the present invention is to provide a mechanism for automatically drooping aircraft ailerons which does not change the total deflection angle of the ailerons.

A still further object of the present invention is to provide a mechanism for automatically drooping ailerons which retains full aileron throw and prevents exceeding maximum useful limits.

Another object of the presentt invention is to provide a mechanism for automatically drooping aircraft ailerons which may be readily installed on aircraft in place of conventional aileron bell cranks.

A still further object of the present invention is to provide a mechanism for drooping aircraft ailerons which is activated by the flap drive when the flaps reach the desired down position.

According to the present invention, the conventional bell cranks which operate the ailerons of an aircraft are each replaced with a dual action mechanical linkage utilizing two bell cranks. One bell crank controls aileron droop and the other causes asymmetric motion of the ailerons. The dual action mechanical linkage is connected through the bell cranks to the aircraft flaps and its ailerons in such a manner that the flap drive will droop the ailerons by a predetermined angle when the flaps reach their desired down position. This drive will also position the linkage so that the total deflection angle of the ailerons does not change, but as the aileron control is moved from its neutral position, the upper deflection angle of the ailerons increases and the lower deflection angle decreases by a like amount. This is accomplished by positioning a fulcrum pin to produce a different rate of acceleration between the input and output arms of the aileron bell crank when the ailerons are deflected from a drooped position than the differential acceleration which exists when they are deflected from a normal zero position.

The present invention can best be understood by considering an example where a fulcrum point is located 90° from a piston. It will then require a large amount of travel per degree for the piston to follow. If, on the other hand, the fulcrum is only 5° off, the piston has very little travel per degree. Thus, by moving the fulcrum point to a new position when the aileron is drooped, the differential acceleration between the input and output arms of the aileron bell crank will be adjusted so that full aileron throw will be met without exceeding maximum useful limits.

The mechanism of the present invention will be described for purposes of illustration but not of limitation, as controlling ailerons having an upper deflection angle of 25°, a lower deflection angle of 15° and a droop angle of 7½°.

The features of the present invention which are believed to be novel are set forth with particularity in the appended claims. The present invention, both as to its organization and manner of operation, together with further objects and advantages thereof, may best of understood by reference to the following description, taken in connection with the accompanying drawings, in which:

Figure 8:
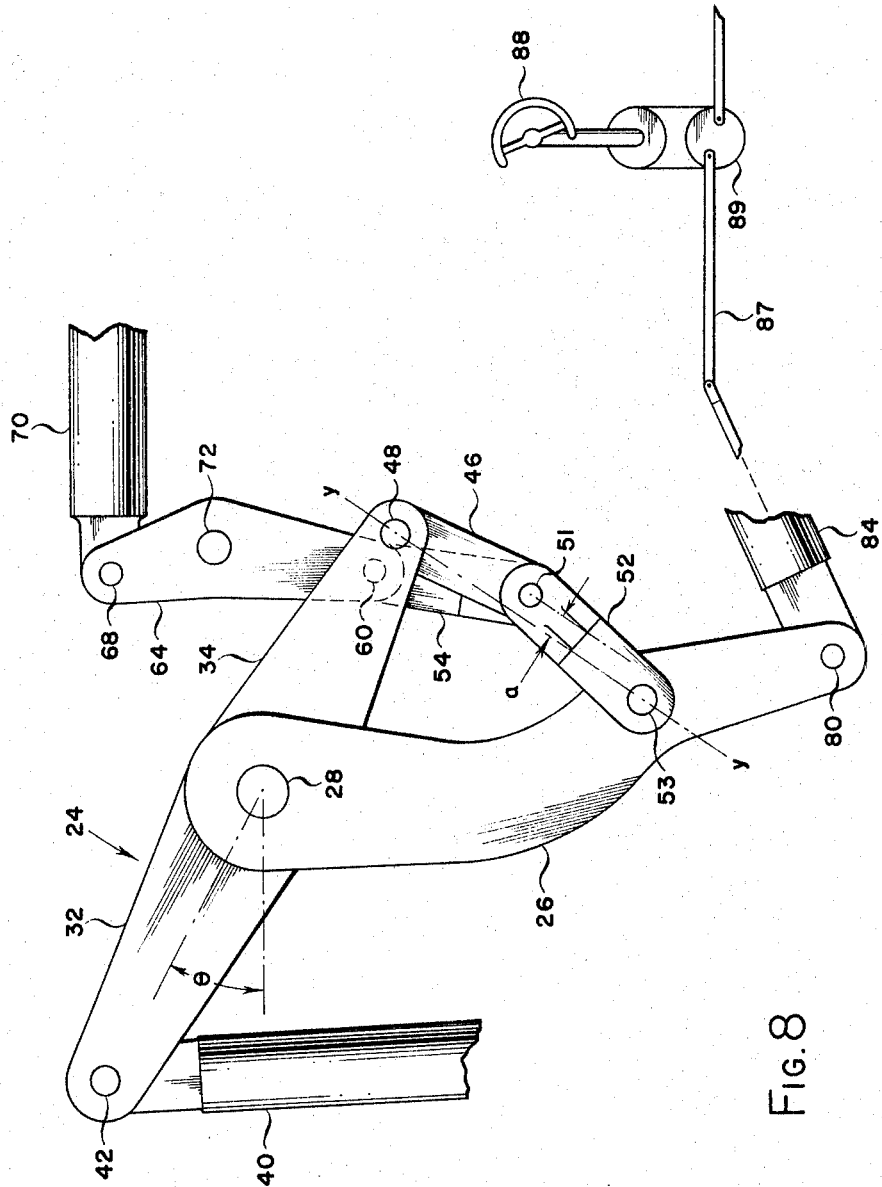
Figure 9:
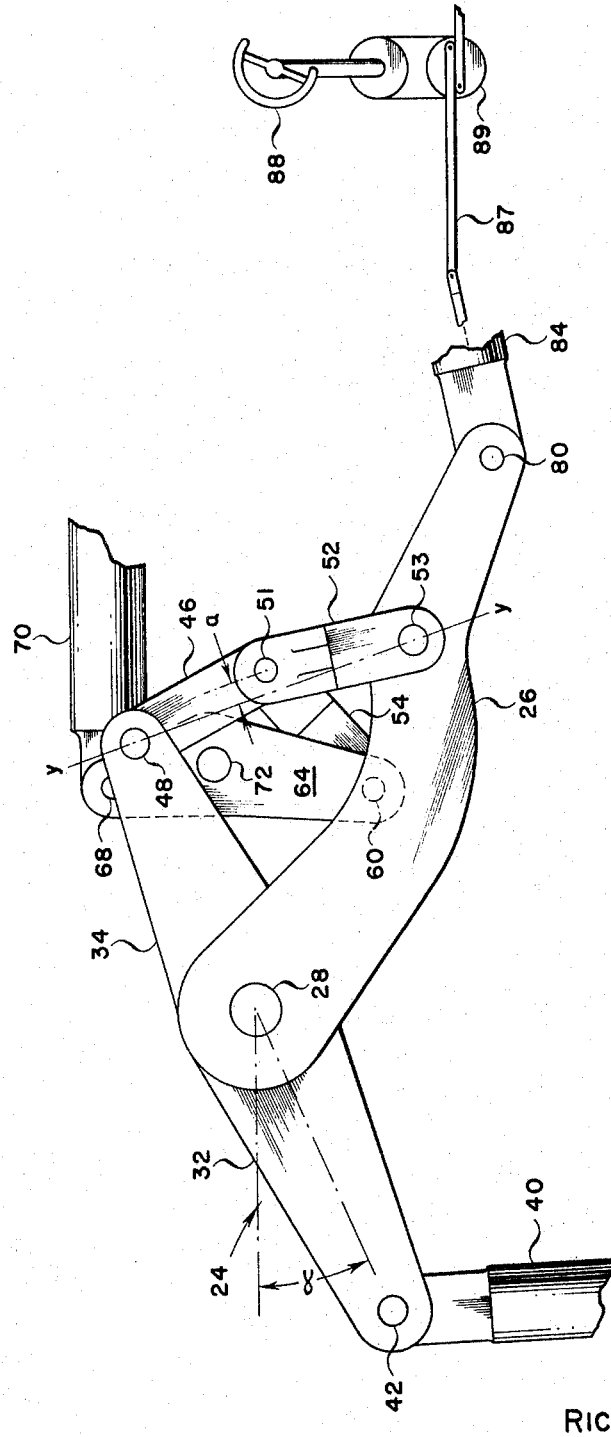
Figure 10:
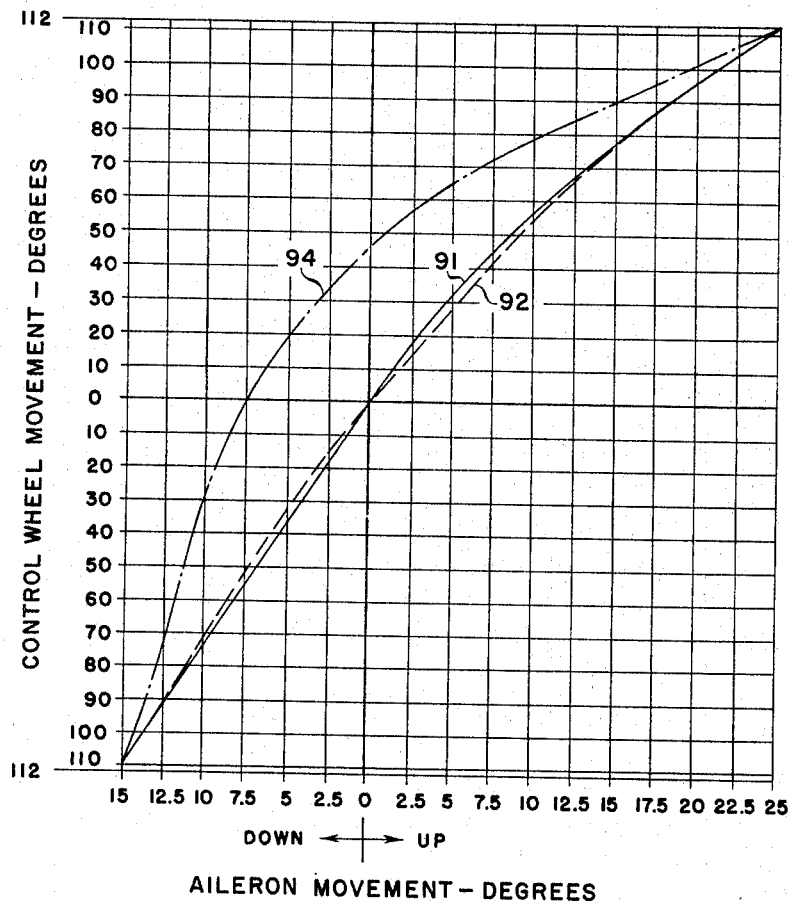

FIGURES 4–9, inclusive, are diagrammatic views showing different operating positions of the control mechanism; and FIGURE 10 is a graph of an aileron throw envelope.

Figure 1:
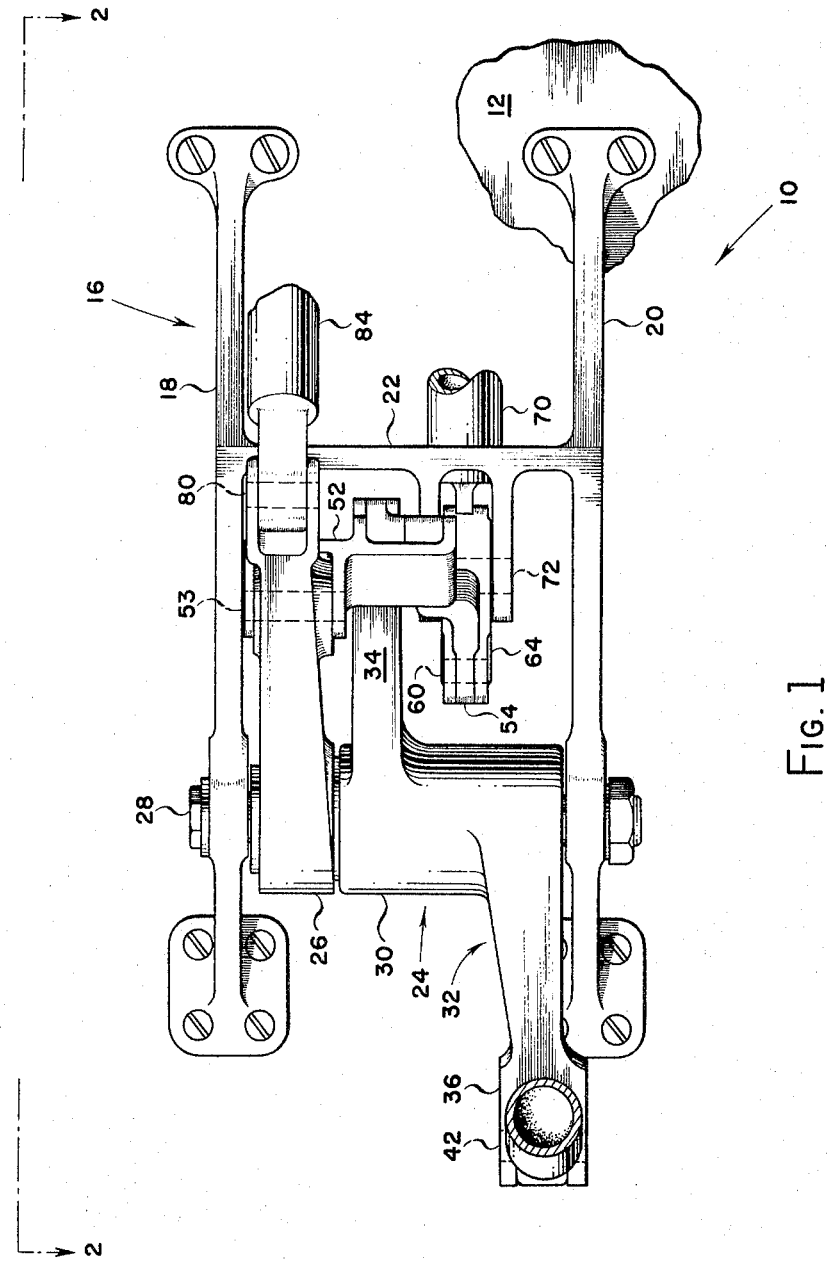
FIGURE 1 is an elevational view of the control mechanism of the present invention.
Figure 2:
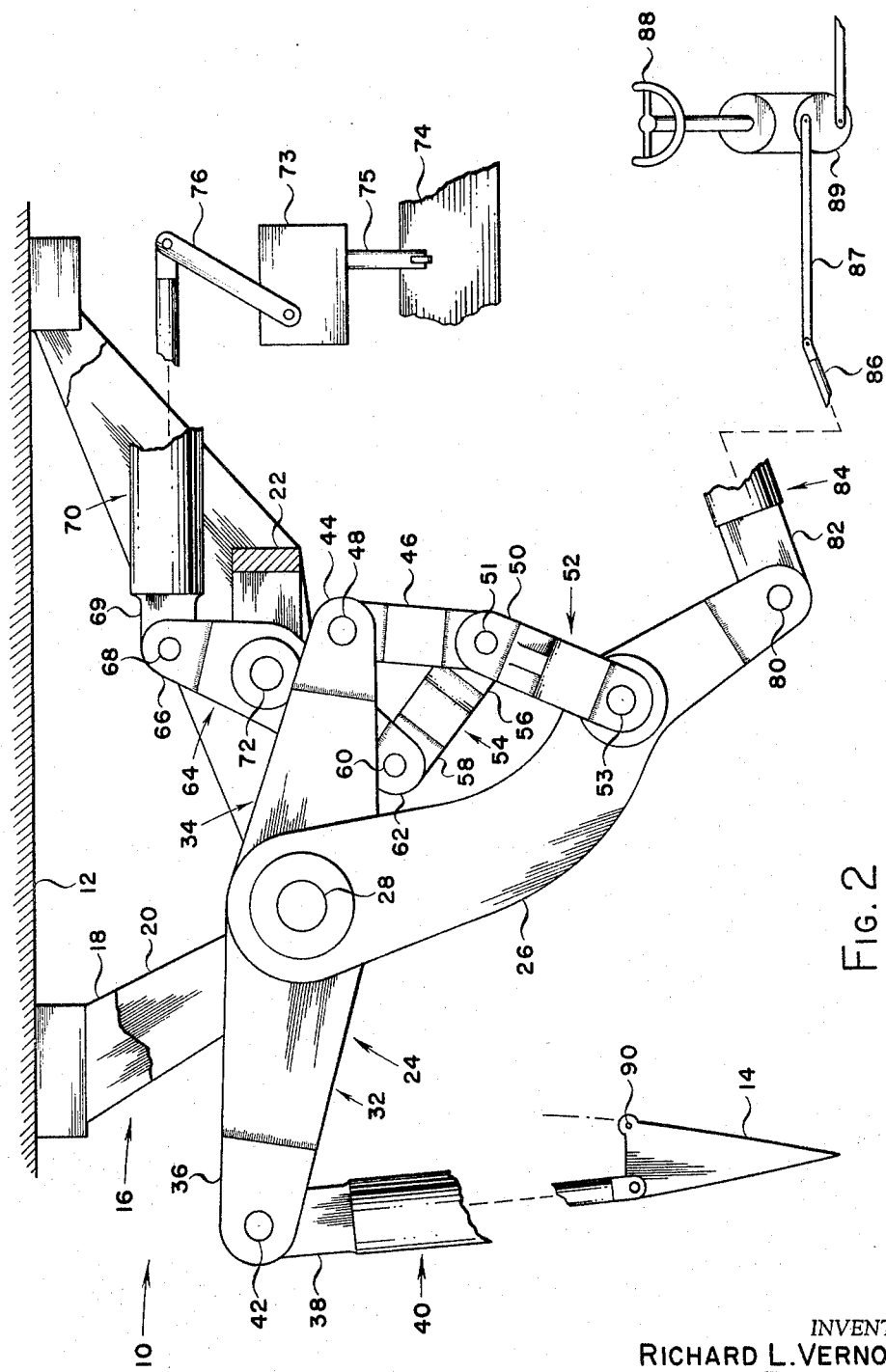
FIGURE 2 is a plan view of the mechnism of FIGURE 1.
Figure 3:
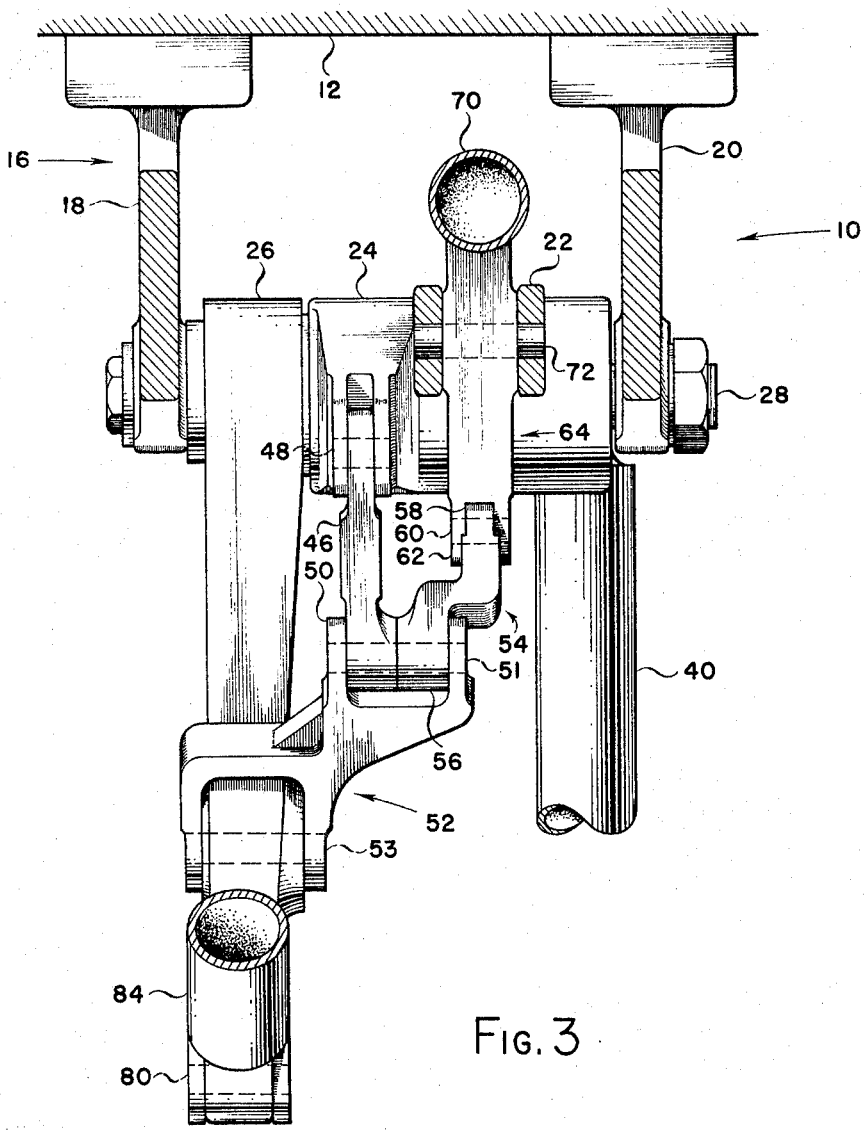
FIGURE 3 is a cross sectional view taken along line 3—3 of FIGURE 2.

Referring again to the drawings and particularly to FIGURES 1–3, a control mechanism of the present invention, generally designated 10, is shown attached to a beam 12 in the wing of an aircraft, not shown. While a single control mechanism 10 is shown for purposes of illustration, but not of limitation, as controlling a single swingable member or aileron 14, it is to be understood that a like mechanism 10 will be employed to control the other aileron, not shown. The control mechanism 10 is connected to the beam 12 by means of a frame 16 having spaced, parallel rails 18 and 20 which are connected together by means of an interconnecting member 22. An output lever 24 and an input lever 26 are pivotally mounted for simultaneous rotation on a common shaft 28 in the frame 16. The output lever 24 includes a hub portion 30 and offset arms 32 and 34. The arm 32 includes a bifurcated end 36 to which the tang 38 (FIGURE 2) of an aileron tie rod 40 is pivotally connected by means of a pin 42. The arm 34 of lever 24 has a bifurcated end 44 to which one end of a first link 46 is pivotally connected by means of a pin 48. The other end of the first link 46 is pivotally connected by means of a pin 51 to one bifurcated end 50 of a second link 52. The other bifurcated end of the link 52 is offset from the end 50 and is pivotally connected by a pin 53 to the input lever 26 intermediate its ends. The bifurcated end 50 of the link 52 is wide enough to accommodate a third link 54 having one end 56 pivotally connected thereto by the pin 51. The other end 58 of link 54 is pivotally connected by means of a fulcrum pin 60 to one end 62 of a bell crank 64. The other end 66 of the bell crank 64 is pivotally connected by means of a pin 68 to an end 69 of a push rod 70 and the bell crank 64 is pivotally mounted intermediate its ends on interconnecting member 22 by means of a pin 72. The push rod 70 is positioned by an actuator 73 in such a manner that it reflects the position of a flap 74 forming part of the aircraft wing, not shown. The actuator 73 drives a telescoping screw 75, which raises and lowers the flap 74. A power take-off lever 76 connects the push rod 70 to the actuator 73. Push rod 70 pivots bell crank 64 about pin 72 thereby changing the position of fulcrum pin 60.

The end of lever 26 which is remote from pin 28 is pivotally connected by means of a pin 80 to one end 82 of a tie rod 84 which has its other end 86 pivotally connected to an aileron push-pull connecting rod 87 which is positioned by an aileron control wheel 88. The wheel 88 is employed to swing aileron 14 about its pivot 90 by rotating an eccentric 89 to reciprocate connecting rod 87 and transmit a force through tie rod 84, lever 26, first and second links 46 and 52, output lever 24 and tie rod 40.

Figure 4:
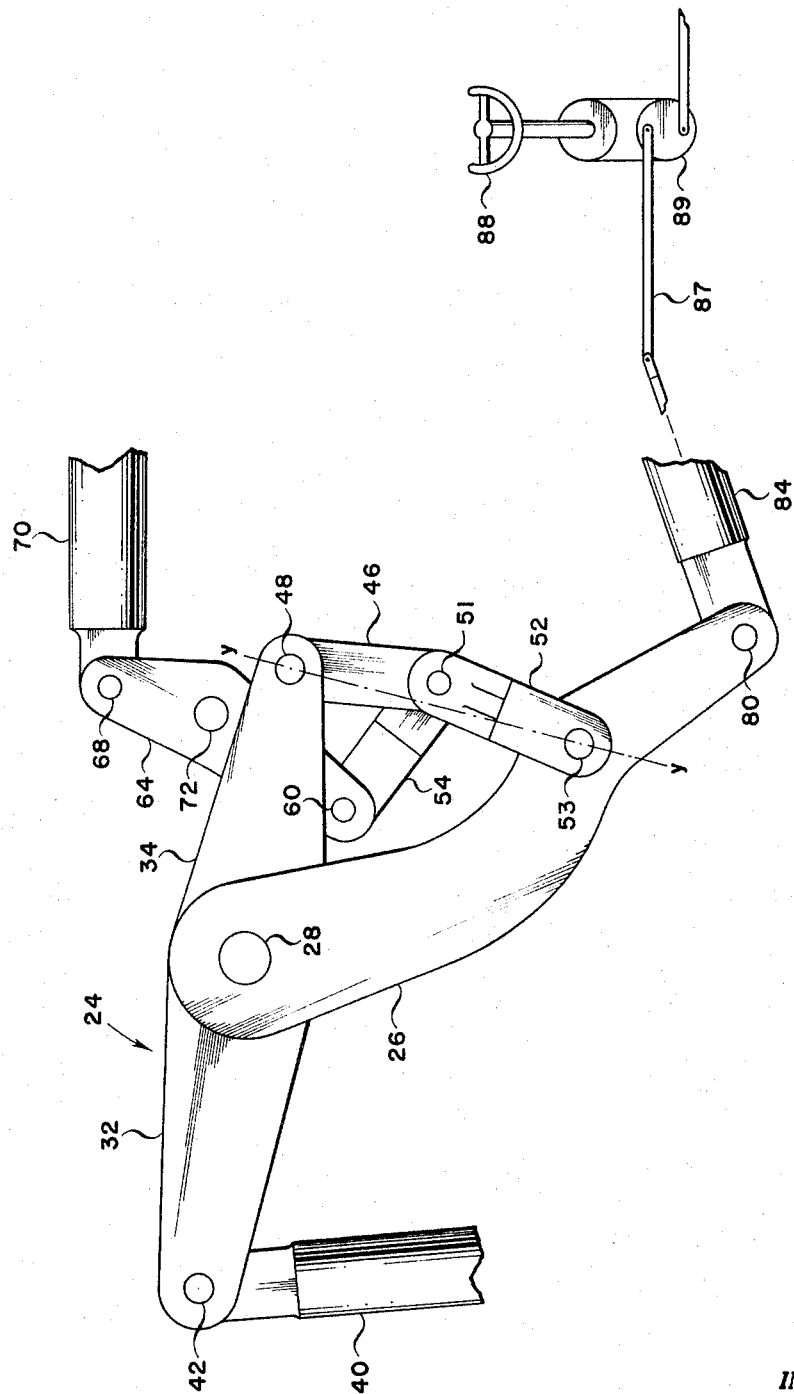

Referring now to FIGURE 4, when the flap 74 is moved to its up position, push rod 70 will pivot bell crank 64 about its pivot 72 in such a manner that link 54 positions first and second links 46 and 52 with only a small angle between them so that they form nearly a straight line Y—Y. Then, with the aileron control wheel 88 in a neutral position, the aileron 14 will be at a first neutral position of zero degrees with its trailing edge faired with the trailing edge of the aircraft wing, not shown. The fulcrum pin 60 will be located in its "no droop" position so that the link 54 will control links 46 and 52 to assure that aileron 14 swings to its maximum deflection angle when control wheel 88 is moved a predetermined amount.

Figure 5:
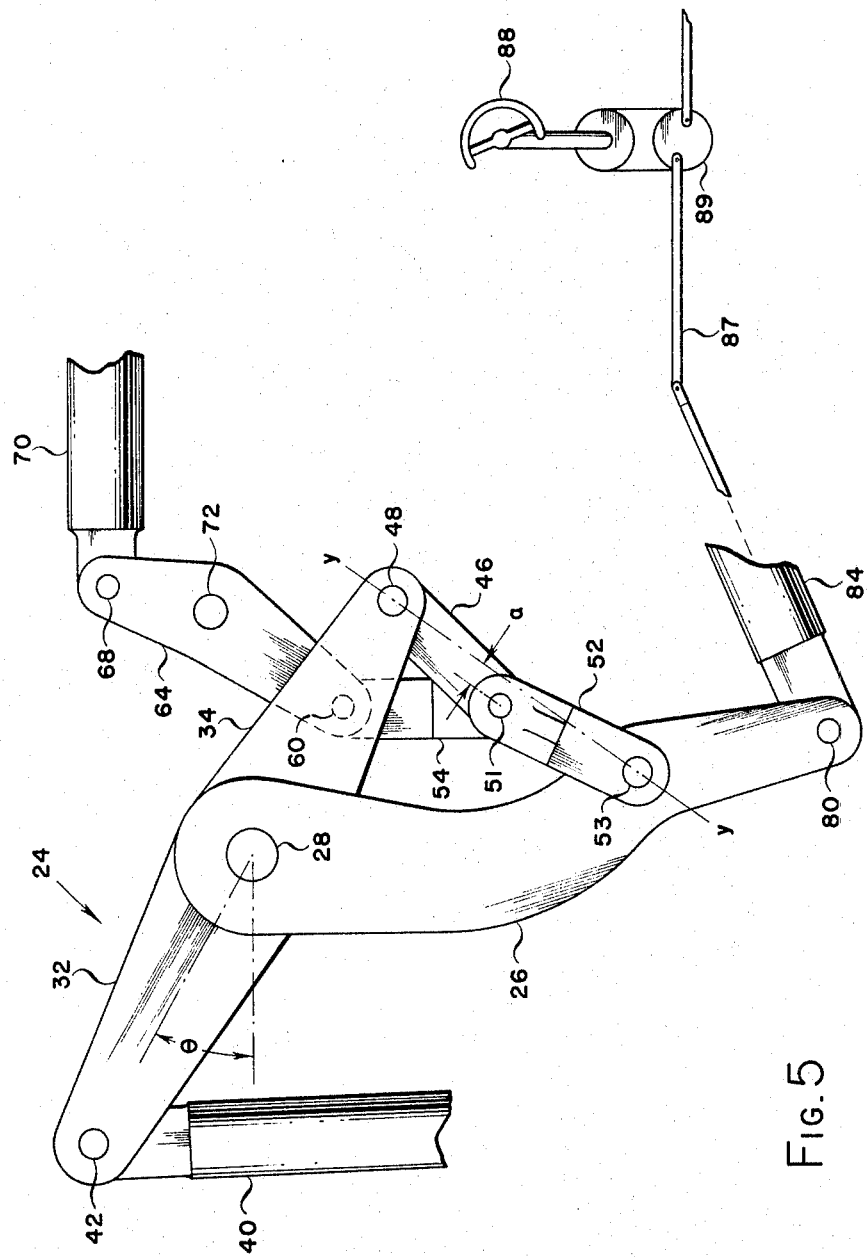
Figure 6:
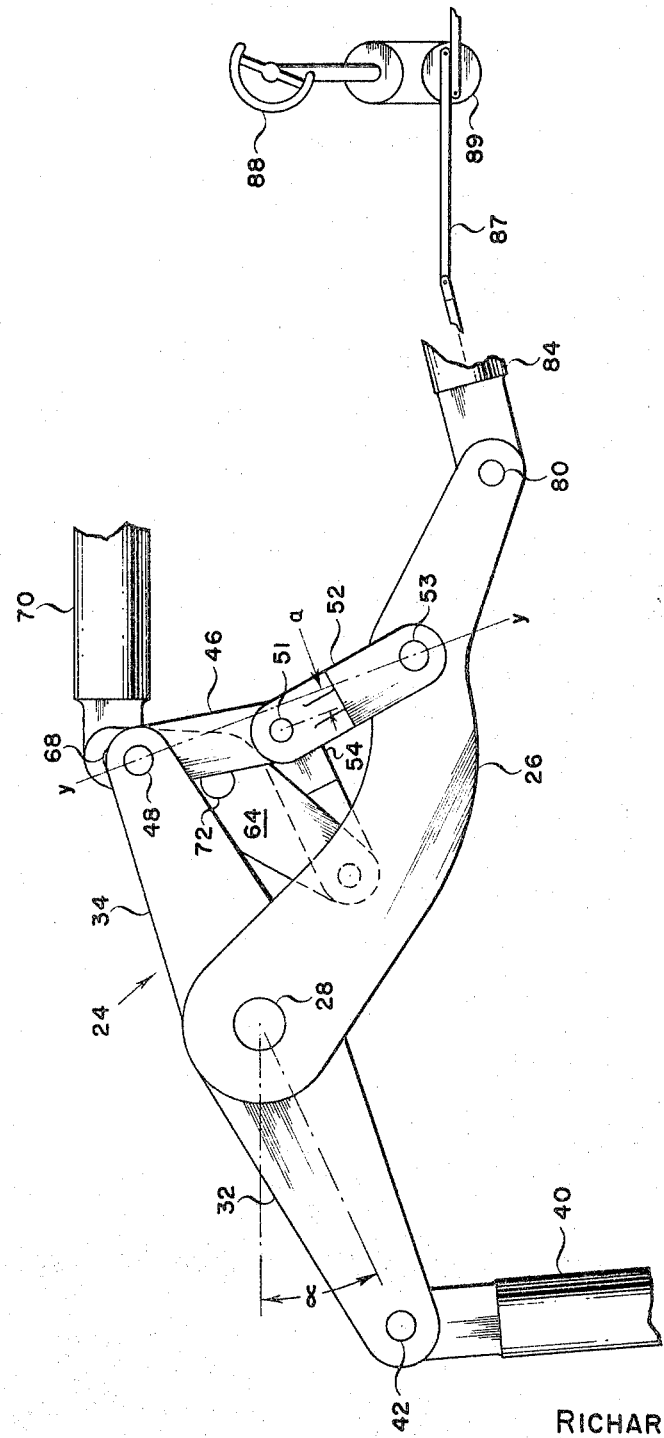

Referring now to FIGURE 5, assuming that flap 74 is still in its up position and that control wheel 88 is rotated to position aileron 14 in its maximum down position (15°), the links 46 and 52 still form nearly a straight line. However, with respect to the position shown in FIGURE 4, the pivot point 51 has moved from one side of the imaginary line Y—Y to the other side thereof. Should control wheel 88 then be rotated to position aileron 14 to its maximum up position (25°) while flap 74 is still in its up position, as shown in FIGURE 6, pivot point 51 will first shift to the position shown in FIGURE 4 as the aileron passes through its zero position and then shift back to the other side of the line Y—Y. Thus, links 46 and 52 rotate about fulcrum pin 60 under the control of link 54 upon actuation of wheel 88. Therefore, the acceleration imparted to aileron 14 is a function of the location of fulcrum pin 60.

Figure 7:
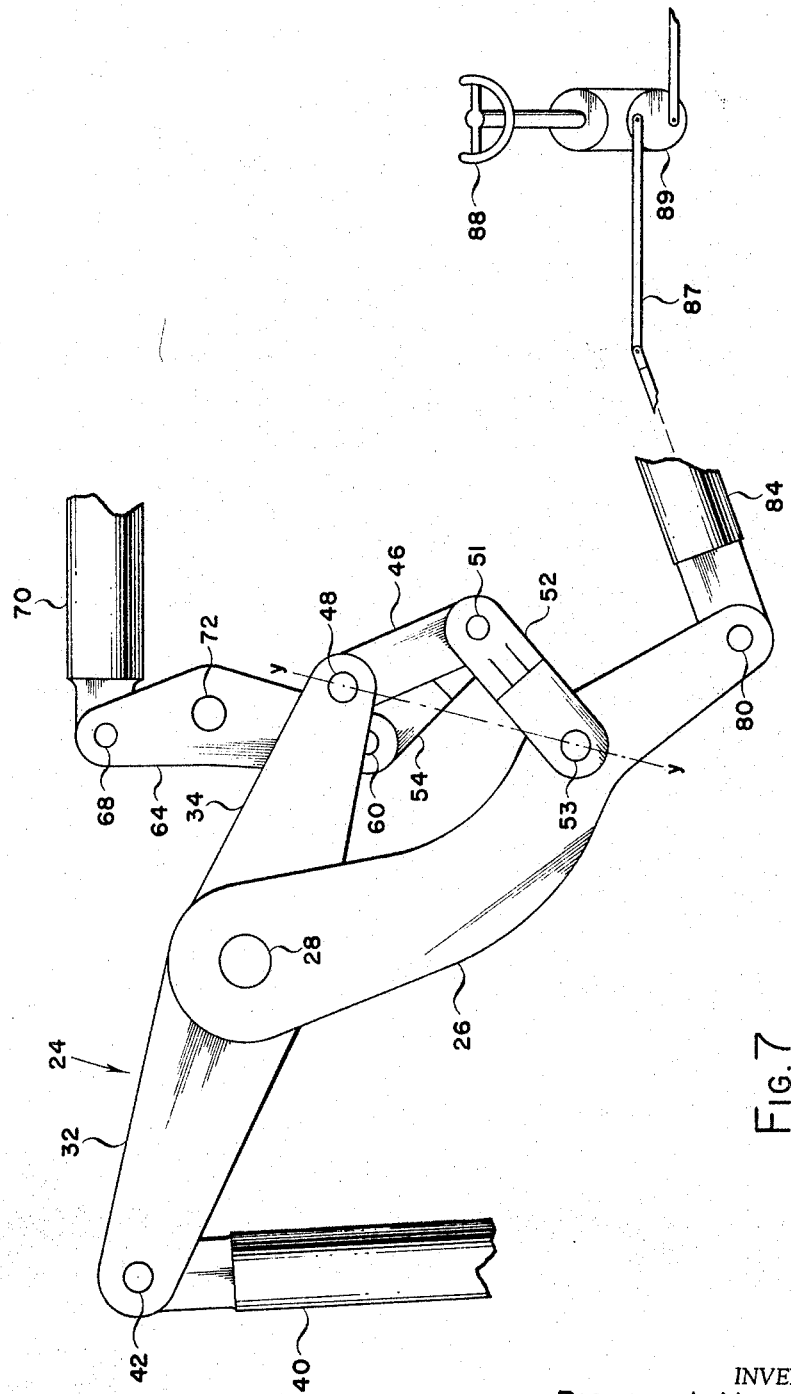

Referring now to FIGURE 7, with control wheel 88 again in its neutral position, if the flap 74 is moved to its down position, rod 70 will rotate bell crank 64 in a counterclockwise direction about pin 72 to move fulcrum pin 60 to a "droop position" thereby changing the position of link 54 so that links 46 and 52 will have a lesser angle between them. This swings output lever 24 clockwise about pin 28 to move tie rod 40 to droop aileron 14 until its trailing edge is 7°30′ below the trailing edge of the aircraft wing, not shown. This is the second neutral or drooped position of aileron 14 which, as pointed out above, has been chosen as 7°30′ for purposes of illustration. In this position, the relative positions of input lever 26, tie rod 84 and control lever 88 have not changed.

Referring to FIGURE 8, a maximum throw has been imparted to control wheel 88 to position aileron 14 in its maximum down position (15°) while flap 74 remains in its down position. Under these conditions, the pivot point 51 is disposed on the other side of line Y—Y from what it was in FIGURE 5, but in each case it is disposed dimension $a$ therefrom. The angle theta is the same in both FIGURES 5 and 8, indicating that the maximum deflection of aileron 14 in its down position is the same regardless of the position of flap 74.

Referring now to FIGURE 9, the control wheel 88 has been moved to its maximum throw in the opposite direction from that shown in FIGURE 8 to position the aileron 14 in its maximum up position (25°). The flap 74 is in its down position so that fulcrum pin 60 is in it droop position. Pivot point 51 is disposed on the opposite side of line Y—Y from what it was in FIGURE 6 where the flap 74 is in its up position, but will still be disposed dimension $a$ therefrom. The angle alpha is the same in FIGURES 6 and 9 indicating that the maximum deflection of aileron 14 in its up position is the same regardless of the position of flap 74.

Referring now to FIGURE 10, control wheel movement in degrees has been plotted against aileron movement in degrees in a system wherein an aileron has a maximum downward deflection of 15° and maximum upward deflection of 25°. The solid line 91 represents aileron movement when a conventional differential bell crank connects the aileron to the control wheel. The broken line 92 represents aileron movement when a droop mechanism of the present invention is employed in place of a conventional bell crank, but is not actuated. The broken line 94 represents the condition when the droop mechanism of the present invention is actuated in a system requiring 7½° droop on the ailerons. Optimum aileron travel is obtained in this system when the droop mechanism is actuated by providing first and second links 46 and 52 of equal length and by providing the lever arm 34 of output lever 24, the lever arm from pivot point 28 to pivot point 53 and the radius developed by link 54 around fulcrum pin 60 of such lengths that the slope of line 94 is as shown on the graph in FIGURE 10.

While the particular control mechanism herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

What is claimed is:

We claim:

1. In an aircraft having a flap having a neutral and a deflected position, an aircraft control mechanism comprising:

(a) a control surface having a neutral position, a droop position, a maximum up deflected position, and a maximum down deflected position;

(b) a member for positioning said control surface between the control surface neutral and maximum up or down deflected positions;

(c) a mechanism operatively inter-connecting said control surface and said positioning member, said inter-connecting mechanism including means for moving said control surface from the neutral position or the droop position to said deflected position when said positioning member is moved a fixed amount; and (d) a means for operating the flap from a neutral to a deflected position and for operating the control surface to a droop position, the operating means including a linkage which does not change the maximum control surface up and down deflected positions when the control surface is either in the neutral or the droop position.

2. The control mechanism of claim 1 wherein said control surface comprises an aileron.

3. The control mechanism of claim 1 wherein said control surface has a second deflected position and said inter-connecting mechanism includes means for moving said control surface from the neutral or the droop to either of said deflected positions when said positioning member is moved a fixed amount.

4. The control mechanism of claim 1 wherein said positioning member comprises an aileron control wheel.

5. The control mechanism of claim 1 including linkage means connecting said inter-connecting mechanism to said flap for moving said control surface from its neutral position to its droop position when said flaps are lowered.

6. In an aircraft having a flap, an aircraft control mechanism comprising:

a control member having a neutral position, a droop position and a deflected position;

a member for positioning said control member; and a mechanism operatively inter-connecting said control member and said positioning member, said inter-connecting mechanism including means for moving said control member from the neutral position or the droop position to said deflected position when said positioning member is moved a fixed amount, the interconnecting mechanism includes;

an output lever having one end connected to said control member, said output lever being pivotally mounted intermediate its ends;

an input level having one end pivotally connected to the pivotal mounting for said output lever and its other end connected to said positioning member;

a first link pivotally connecting said input lever intermediate its ends to a positionable fulcrum pin;

a second link pivotally connecting said fulcrum pin to the other end of said output lever; and a third link connecting said fulcrum pin to said flap, whereby said fulcrum pin is moved from a first position to a second position and said control member is moved from its neutral position to its droop position when said flap is lowered.

7. The control mechanism of claim 6 wherein said control member comprises an aileron.

8. The control mechanism of claim 6 wherein said first and second links are of equal length.

9. The control mechanism of claim 6 wherein said positioning member comprises an aileron control wheel.

10. The control mechanism of claim 6 including a bell crank connecting said third link to said flap.

References Cited by the Examiner

UNITED STATES PATENTS

| 2,407,401 | 9/1946 | Clauser et al. | 244—83 |
| 2,422,035 | 6/1947 | Noyes | 244—83 |
| 2,478,033 | 8/1949 | Weick | 244—83 |
| 2,685,422 | 8/1954 | Hamond et al. | 244—83 |

FOREIGN PATENTS

| 681,209 | 2/1940 | Germany. |
| 803,949 | 11/1958 | Great Britain. |

MILTON BUCHLER, *Primary Examiner.*

ANDREW H. FARRELL, *Examiner.*